(No Model.)
J. T. TITUS.
SEWER TRAP AND FLUSHING GATE.
No. 572,078. Patented Nov. 24, 1896.
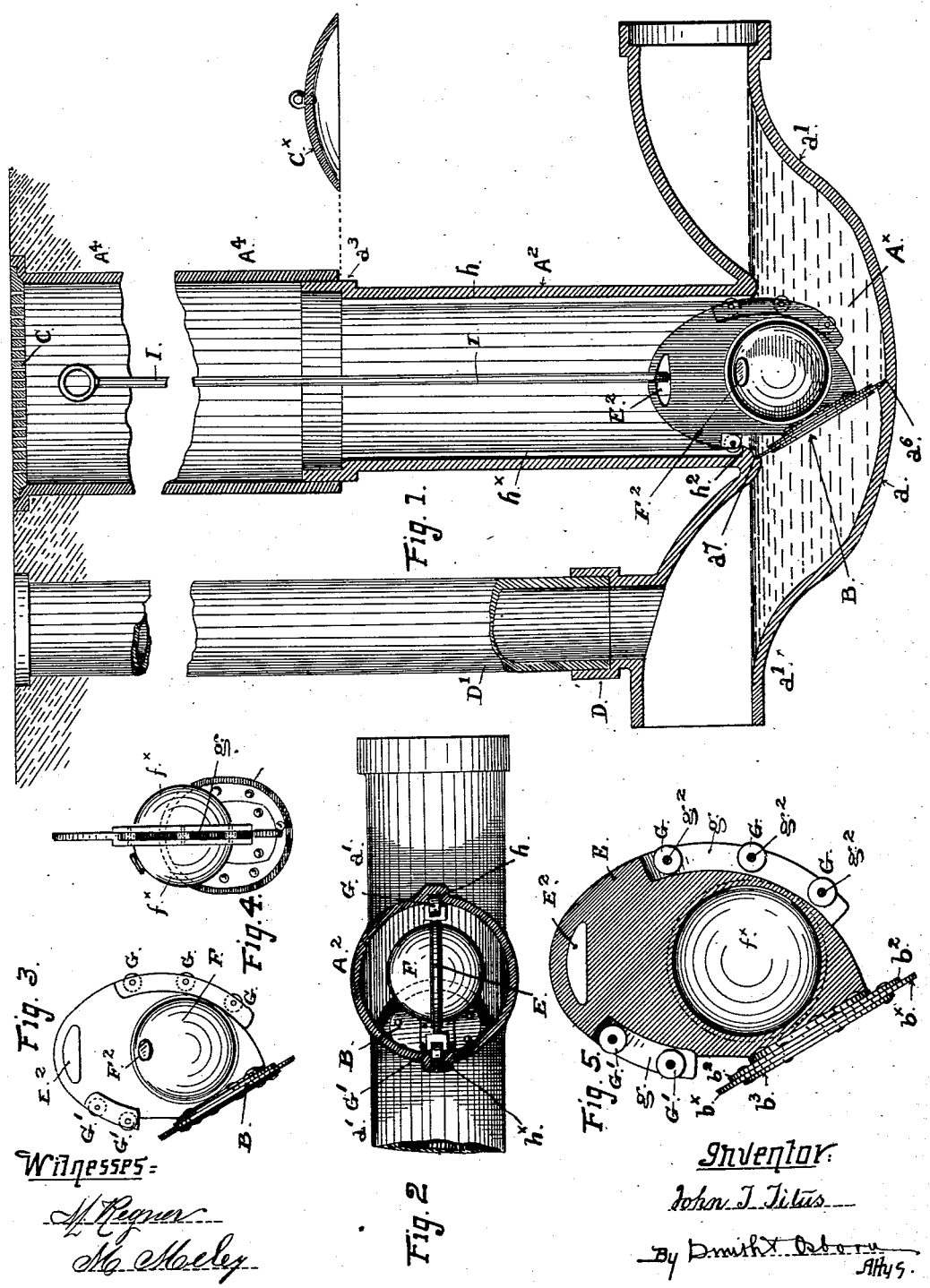

UNITED STATES PATENT OFFICE.

JOHN T. TITUS, OF SAN FRANCISCO, CALIFORNIA.

SEWER-TRAP AND FLUSHING-GATE.

SPECIFICATION forming part of Letters Patent No. 572,078, dated November 24, 1896.

Application filed February 6, 1896. Serial No. 578,221. (No model.)

*To all whom it may concern:*

Be it known that I, JOHN T. TITUS, a citizen of the United States, residing in the city and county of San Francisco and State of California, have invented certain new and useful Improvements in a Combined Sewer-Trap and Flushing-Gate, of which the following is a specification.

My invention relates to improvements made in sewer-traps of that class or description which are designed to cut off the entrance of foul gases into the pipes and connections between house-fixtures and the sewer, and are constructed also to prevent the tide-water from backing up into the house-pipes from the sewer.

The present construction of trap is an improvement in several respects upon the Letters Patent of the United States No. 245,674 that were granted to me on the 16th day of August, 1881; and these improvements have for their object mainly to make the valve in the trap automatically intermittent in its opening and closing movements, whereby it will remain shut and will hold back the waste water in the pipes or connections between the house and the trap until the head or pressure of such body of water is sufficiently great to have a flushing effect on the pipes, and then under such pressure the valve will swing back and release the body of water behind it and afterward return automatically to position and close the trap for another operation in the same manner, this valve being susceptible of adjustment or regulation to vary the degree of this head or pressure at will.

Another object sought to be attained is to enable the valve to be used as a flushing-gate, whereby it can be operated by hand to confine and hold the water in the waste-pipes of the house until a considerable body of water is accumulated and a high pressure is obtained, and then release such body of water and allow a full and free discharge of the same through the trap and the connecting-pipes.

To such ends and objects my said invention consists in the described construction of valve and the combination therewith of a trap or body adapted for insertion in position in the length of a connection between house and sewer, all as hereinafter fully set forth, reference being had to the drawings that accompany and form part of this specification.

In the said drawings, Figure 1 is a longitudinal sectional view of a sewer-trap constructed according to my said invention. Fig. 2 is a top view of parts shown in Fig. 1. Fig. 3 is a side view of the valve and float. Fig. 4 is a view of the valve and float, taken from the right-hand side of Fig. 3. Fig. 5 is a longitudinal sectional view of the valve and float on an enlarged scale.

The body of the trap is shaped as shown in Figs. 1 and 2, with a curved middle portion $a$, forming the valve-chamber $A^\times$, and straight end portions $a'$ $a'$, provided with the usual flanges to receive the ends of the sections of pipe that connect the house-pipe with the trap and the trap with the sewer. From the top of the curved portion the stand-pipe $A^2$ extends perpendicularly upward and is provided on the top end with the flange $A^3$, to which the pipe or casing $A^4$, of proper length, is joined to carry this pipe up to the surface of the street. The length of this casing is regulated by the distance of the trap below the surface of the ground, which is found to vary in different localities. In some cases this distance is fixed at ten feet and in others it is greater or less than such distance. Through this casing and the standing connection $A^2$, of which it is a continuation, access to the valve-chamber is furnished for introducing and removing the valve B, and also for operating such valve from the surface of the ground by hand when it is employed as a flushing-gate.

A removable cover C, with ventilating-apertures, is placed over the top of the casing, and an inner cover $C^\times$ is usually set over the end of the pipe $A^2$ within the casing for the purpose of excluding from the valve-chamber any dirt or particles that might be liable to drop through the perforated cover from the surface of the street.

Where a fresh inlet is required by law to be provided on these traps between the valve and the house connection, as it is in some cases, a connection or coupling D is provided on the body of the trap, to which an air-pipe D' is joined in the usual manner.

The valve B is arranged for operation within the curved middle portion of the body in such position that when closed it will set at an inclination of about sixty degrees out of the vertical, as shown in Fig. 1, and projections or shoulders $a^6$ $a^7$ are formed on the top and the bottom surfaces of the valve-chamber for seats, against which the valve is pressed and held by the pressure against its back face from the sewer side of the trap. By virtue of this position the valve requires to have an oval shape in outline in order to fit closely and shut the passage from the chamber portion into the upwardly-curved member $a'$, and thus the valve is formed of the flexible disk $b^\times$, of oval shape in outline, and the metal disks $b^2 b^3$, of corresponding shape of outline, between which the flexible disk is fixed by rivets or screws.

To the back plate $b^2$ is secured a thin metal plate or flange E, of oval shape in outline, standing perpendicularly backward and upward from the back of the valve when the same is resting against its seat. The center of this plate is cut away in a circular outline, and to the opposite sides or faces are fixed by tight joints two hollow cup-shaped metal pieces or hemispheres $f^\times$ $f^\times$ in such manner that the hollow air-tight float or ball F is formed on the back of the valve. An aperture is made in the upper side of this ball, to which is fitted a screw-cap $F^2$ for closing it tightly.

On the margin or edge of the plate F are formed slots or recesses $g$ $g$ to receive sets of rollers G G'. These are loosely fitted on pins or axles $g^2$ to turn freely, and are arranged on the edges of the plate E on opposite sides of the perpendicular line that would pass through the center of the plate when standing in position in the valve-chamber with the valve closed on its seat. One set of these rollers is thus in line with and will run in the vertical groove or guide-channel $h$, formed in one side of the extension $A^2$, while the other set, $G^\times$, will be in line with and will run in the opposite groove $h^\times$.

The groove $h^\times$ is closed at the bottom to form a stop and bearing $h^2$ for one of the rollers G, by virtue of which the valve in its opening and its closing movements will turn in that point as on a hinge when the roller is resting in the closed bottom of the groove $h$. This valve has two movements both in opening and in closing under the action of a large body of water passing through the trap, that is to say, a swinging movement on the point $h^2$ at the top as on a hinge and a perpendicular movement upward into the extension $A^2$ in opening and a downward movement therefrom into the valve-chamber in closing, by virtue of which both a clear discharge-passage is afforded and a quick return and seating of the valve are insured at each action. These movements are facilitated and the right position of the valve is insured at all times by the construction and arrangement of guide-flange and rollers and the grooves in the standing pipe, as above described. In addition to these qualities and features, whereby it operates as an automatic valve, this valve has the function of a flushing-gate, whereby it can be operated to hold back a considerable body of water in the pipes and connections between the trap and the house in order to accumulate pressure of water for flushing the pipes, and it is also capable of adjustment so that it can be made to operate automatically and at intervals, and thereby release a body of water held back by it between the valve and the trap as often as the pressure of such body of water may exceed the weight and pressure against the back of the valve. In order to produce this automatic action, the float or ball is loaded by unscrewing the cap $F^2$ and introducing small masses of metal into the ball until the required weight is obtained, and in this way the greater or less degree of resistance to the pressure on the front side of the valve is given to the ball F. Provision is made also for working the valve by hand as a flushing-gate, and for this purpose a rod I is attached to the upper part of the flange by means of a hook F on the lower end of the rod, and a slot $E^2$ on the plate over the center line of the ball. Such rod is made of proper length to be reached and managed from the surface of the street through the casing, and when so attached to the flange the rod serves to hold the valve down to its seat until the pipes and connections in front of the valve are filled and then the valve is raised from its seat and is drawn up into the stand-pipe to give a full and rapid discharge. My present construction of valve thus allows and provides for such action and operation as an automatic valve, as an intermittently and automatically acting flushing-gate, and as a hand-operated flushing-gate.

Having thus fully described my invention, what I claim as new, and desire to secure by Letters Patent, is—

1. The improved trap and flushing-gate for sewer connections, consisting of the trap-body having the curved valve-chamber; the upright pipe extending perpendicularly upward from the top of the valve-chamber to the surface of the ground; the valve-seat in the chamber beneath; and the valve fitted to said seat and comprising the oval-shaped valve-disk, the hollow ball on the back of said disk having an aperture closed by a cap, the perpendicular flange extending upward from the back of the valve-disk and having guide-rollers on the edges thereof; and the perpendicular grooves in the upright extension over the valve-chamber, one of said grooves being closed at the bottom to form a bearing for one of the guide-rollers, combined for operation as hereinbefore described.

2. The combination, with the trap-body composed of the horizontally-set valve-chamber having an inclined valve-seat and the vertically-standing pipe extending upward from the top of said chamber and provided with vertical grooves on the inside located diametrically opposite to each other, one of said grooves being directly over the upper part of the valve-seat; of the combined valve and flushing-gate consisting of the valve-disk, the centrally-placed perpendicular flange on the back of such disk, the hollow ball or receptacle within said flange having an opening provided with a means for closing it, the guide-rollers on the edges of said flange adapted to fit the grooves in the standing extension of the trap-body, and the rod attached to said flange as a means of controlling and working the valve, constructed for operation as set forth.

In testimony that I claim the foregoing I have hereunto set my hand and seal.

JOHN T. TITUS. [L. S.]

Witnesses:
  LEE D. CRAIG,
  G. C. DALLAMORE.